US005385218A

United States Patent [19]

Migliori

[11] Patent Number: 5,385,218

[45] Date of Patent: Jan. 31, 1995

[54] RACK AND PINION PNEUMATIC ACTUATOR WITH COUNTER-PRESSURE CONTROL AND DAMPING DEVICE

[75] Inventor: Luciano Migliori, Milan, Italy

[73] Assignee: Univer S.p.A., Milan, Italy

[21] Appl. No.: 64,373

[22] Filed: Jan. 29, 1993

[30] Foreign Application Priority Data

Feb. 5, 1992 [IT] Italy .......................... MI92A000222

[51] Int. Cl.[6] .......................... F16F 9/28; F16F 5/00

[52] U.S. Cl. .......................... 188/303; 188/317; 92/85 B; 92/136; 91/23

[58] Field of Search .......................... 92/85 B, 136; 91/23; 188/295, 303, 304, 317

[56] References Cited

U.S. PATENT DOCUMENTS 2,233,521 3/1941 Ernst et al. .
2,279,160 4/1942 Davis .......................... 188/303 X
2,389,654 11/1945 Van Der Werff .......................... 92/136
3,447,423 6/1969 Henry .......................... 92/85 B X
3,831,500 8/1974 Kitamura et al. .......................... 92/68
4,088,063 5/1978 Sheppard .......................... 92/136 X
5,076,090 12/1991 Cetnarowski .......................... 92/136 X

FOREIGN PATENT DOCUMENTS 2200451 4/1974 France .
2405297 8/1975 Germany .......................... 92/136

OTHER PUBLICATIONS

"Actuators, rotary", *Fluid Power Handbook & Directory*, 1986–1987, pp. 36 and 37.

*Primary Examiner*—Robert J. Oberleitner
*Assistant Examiner*—Kevin D. Rutherford
*Attorney, Agent, or Firm*—Young & Thompson

[57] ABSTRACT

A pneumatic, rotary, rack and pinion actuator with counter-pressure actuated damping device. The actuator comprises first and second rack and piston assemblies reciprocable inside corresponding pneumatic cylinders, which engage on the opposite sides of a pinion and output shaft. Each rack and piston assembly is provided with an axially extending duct opening at opposite ends into a drive chamber and a counter-pressure control chamber, respectively; counter-pressure control and damping means are provided in the piston-assemblies and cylinders, comprising a throttling valve opening into the control chamber and a check valve in said ducts; a thrust pin member protrudes in the control chamber and into the duct end to open the check valve and feed in a controlled manner pressurised air from the drive chamber into the control chamber, before each rack and piston assembly reaches the end of its stroke.

9 Claims, 3 Drawing Sheets

RACK AND PINION PNEUMATIC ACTUATOR WITH COUNTER-PRESSURE CONTROL AND DAMPING DEVICE

TECHNICAL FIELD

The present invention relates to fluid powered rotary actuators and in particular relates to a pneumatic rack and pinion actuator provided with a counter-pressure control and damping device, to positively decelerate and damp the movement of rack and piston assemblies at the end of their strokes.

BACKGROUND OF THE INVENTION

Pneumatic, rotary, rack type actuators are known and widely used for converting the reciprocating movement of two opposing rack and piston assemblies into reciprocating rotary movement of a drive shaft. Such rack type pneumatic actuators are known for example from U.S. Pat. No. 3,447,423.

In pneumatic rack-type actuators of the kind mentioned above, it is necessary to adequately slow down and dampen the reciprocating movement of the rack and piston assemblies each time their strokes are reversed, to prevent shocks and damages. Currently, use is made of hydraulic decelerating or damping systems which are mounted outside the actuator using complex and cumbersome solutions which involve additional costs; from U.S. Pat. No. 3,447,423 it is also known the use of a throttling valves comprising pin members arranged on the pistons to enter an inlet port restrict flow of fluid as the piston assemblies approach the ends of their strokes.

In the field of pneumatic actuators it is also known the uses of pneumatic damping devices which intervene at the end of the stroke performed by the piston assembly and which operate on the principle of air compression, with extremely limited damping efficiency and without providing any possibility of controlling the damping effect. In fact, in pneumatic damping devices of the known type, the chamber intended to be subjected to a counter-pressure is normally open or vented to the atmosphere, being closed by the said piston only at the end of its stroke. Therefore, allow air pressure is established in said chamber at a value substantially close to atmospheric pressure and must be compressed by a "pumping" action of the piston, before the latter reaches the end of the stroke resulting in a very limited or inefficient damping and decelerating effect; otherwise extremely long and additional stroke of the piston would be necessary, resulting in a considerable increase in the dimensions as well as the costs of the actuator.

From FR-A-2.200.451 a fluid operated actuator it is known in which a pressurized chamber of a cylinder is brought in communication with an opposite pressureless chamber of the same cylinder by pin actuated valve members provided in a lateral passage of the piston, to be actuated at the approaches of the end of the strokes of the same piston; nevertheless in said actuator, the low pressure chamber is usually vented or connected to a discharging duct and no positive counter-pressure control or controlled dumping actions are possible when the piston assembly approaches and is moving towards the end of it stroke. Therefore, the pneumatic damping devices currently known are difficult to use or to adapt for applications on rack-type rotary actuators, or are not able to provide a positively controlled damping action.

Currently, rack-type rotary actuators incorporating pneumatic damping and controlled decelerating systems, able to satisfy the abovementioned requirements, are not known.

Therefore, the general object of the present invention is to provide a pneumatic rotary actuator of the pinion and rack type, provided with differentiated pneumatic damping actions, to dissipate the accumulated energy by means of a counter-pressure positively generated at a required moment and in a controlled manner, within the same actuator, in an extremely small space at the approaching end of each working stroke, successively allowing a low-down to stop and reverse the sliding movement of the rack and piston assemblies.

A further object of the present invention is to provide a rack-type rotary actuator provided with an internal, pneumatic, counter-pressure damping device, as mentioned above, having a very low cost and by means of which it is possible to achieve a high damping and decelerating effect, with high counter-pressure values, equivalent or close to the pressure value of the operating fluid of the same actuator.

A further object of the present invention is to provide a pneumatic rotary actuator of the rack type, by means of which it is possible to control both the instant when the deceleration phase starts and the value of the counter-pressure required to dissipate entirely the accumulated energy, whilst keeping the overall dimensions very compact and substantially equivalent to the useful working stroke of the said actuator.

A further object of the present invention is to provide a rotary pneumatic actuator of the rack type, by means of which it is possible to continuously adjust the working stroke or to obtain a programmable intermediate stopping position, whilst maintaining the desired damping effect.

SUMMARY OF THE INVENTION

All of the above can be achieved by means of a pneumatic rotary actuator of the rack and pinion type, with counter-pressure actuated damping device, the actuator comprising first and second rack and piston assemblies reciprocable inside corresponding pneumatic cylinders and engaging on the opposite sides of a pinion connected to an output shaft, each rack and piston assembly being provided with an axially extending duct opening at opposite ends into a drive chamber and a counter-pressure control chamber respectively of said cylinders, said counter-pressure control and camping means being provided in the piston assemblies, and a throttling valve opening into the control chambers, a check valve being provided in each of said ducts, and a thrust pin member protruding in the control chamber and into the duct end to open the check vale and fed in a controlled manner pressurised air from the drive chamber into the control chamber, before each rack and piston assembly reaches the end of its stroke.

BRIEF DESCRIPTION OF THE DRAWING

The pneumatic rotary actuator according to the invention will be illustrated in greater detail hereinbelow, with reference to some solutions shown in the accompanying drawings, in which.

DETAILED DESCRIPTION OF THE INVENTION

Figure 1:
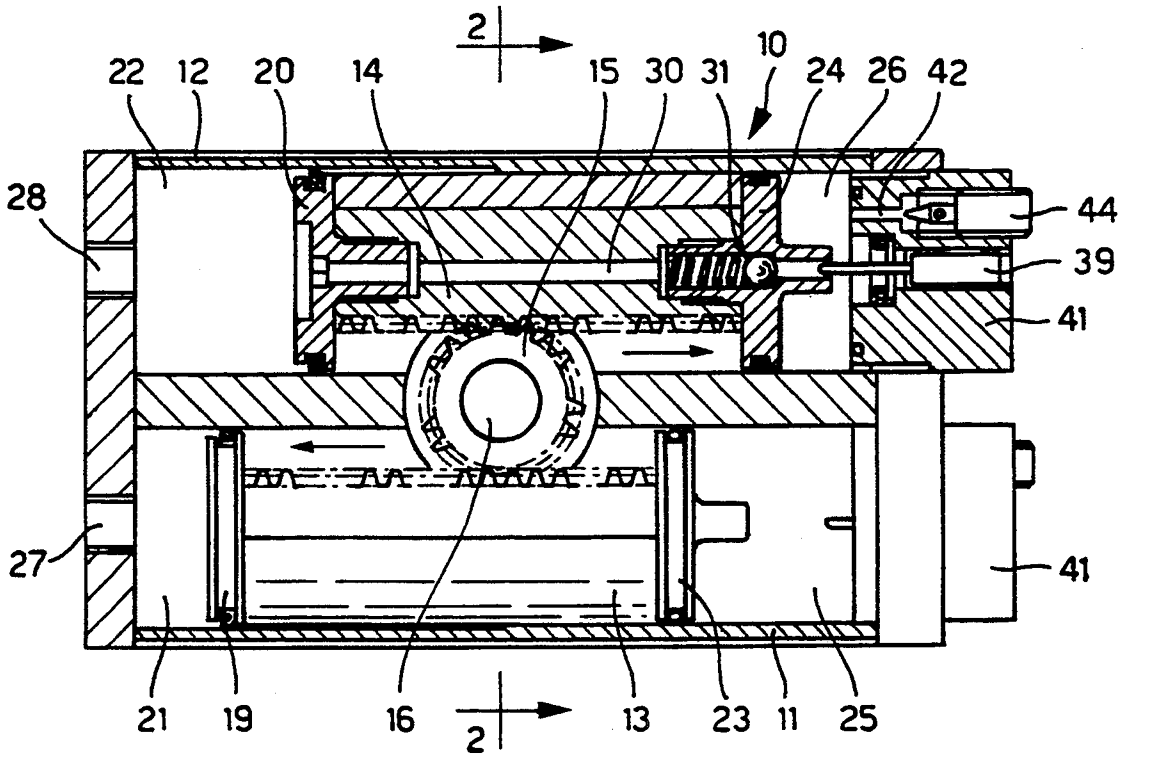
FIG. 1 is a partially sectioned view of a first embodiment of the pneumatic actuator according to the invention.
Figure 2:
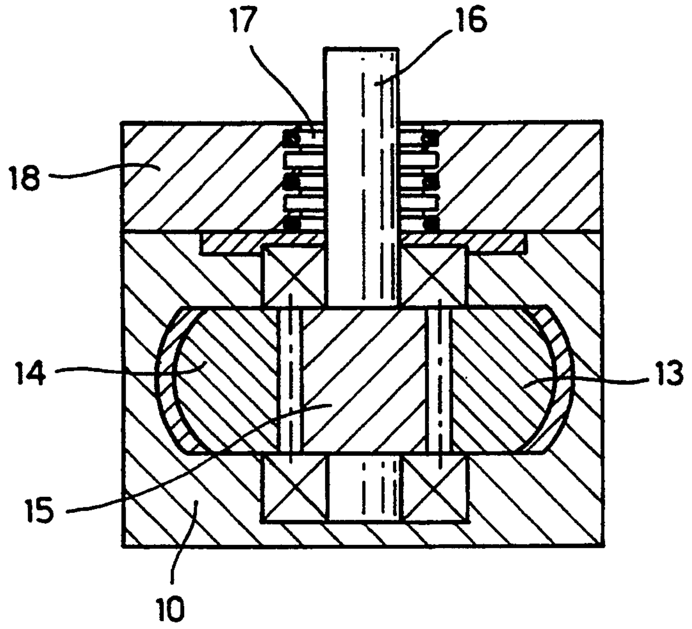
FIG. 2 is a section along the line 2—2 of FIG. 1.

In the example shown, the actuator denoted overall by 10 consists of a body member defining, respectively, a first pneumatic cylinder 11 and a second pneumatic cylinder 12 located alongside and parallel to the former.

Rack and piston assemblies comprise racks 13, 14 which slide inside the cylinders 11, 12 in a reciprocating manner and have teeth meshing with the opposite sides of a central pinion 15 of an output shaft 16, which protrudes through an opening 17 in a covering plate 18 of the body 10 of the actuator.

At the corresponding ends of each rack 13 and 14 there are provided two pistons 19 and 20 which reciprocate or are movable inside a first chamber, 21 and 22 respectively, also called drive chamber for the pneumatic cylinders 11, 12, as well as pistons 23 and 24 respectively, movable inside a corresponding second chamber, 25 and 26 respectively, also called counter-pressure chamber; the counter-pressure chamber inside each cylinder is axially aligned with the drive chamber 21, 22 and has a slightly smaller inside diameter in order to produce a differentiated counter-pressure action. Both pneumatic cylinders 11 and 12 are of the single-acting type, operating alternately, i.e. one in a first direction and then the other one in the opposite direction, so as to cause a reciprocating rotation of the shaft 16. 27 and 28 in FIG. 1 denote inlet ports or apertures for the pressurised fluid at corresponding ends of both the pneumatic cylinders.

As previously mentioned, the pneumatic actuator according to the invention comprises counter-pressure actuated damping means for dissipating the energy accumulated during the movement by the piston assemblies, said energy being rapidly dampened in an extremely small portion of the piston and rack stroke.

Figure 3:
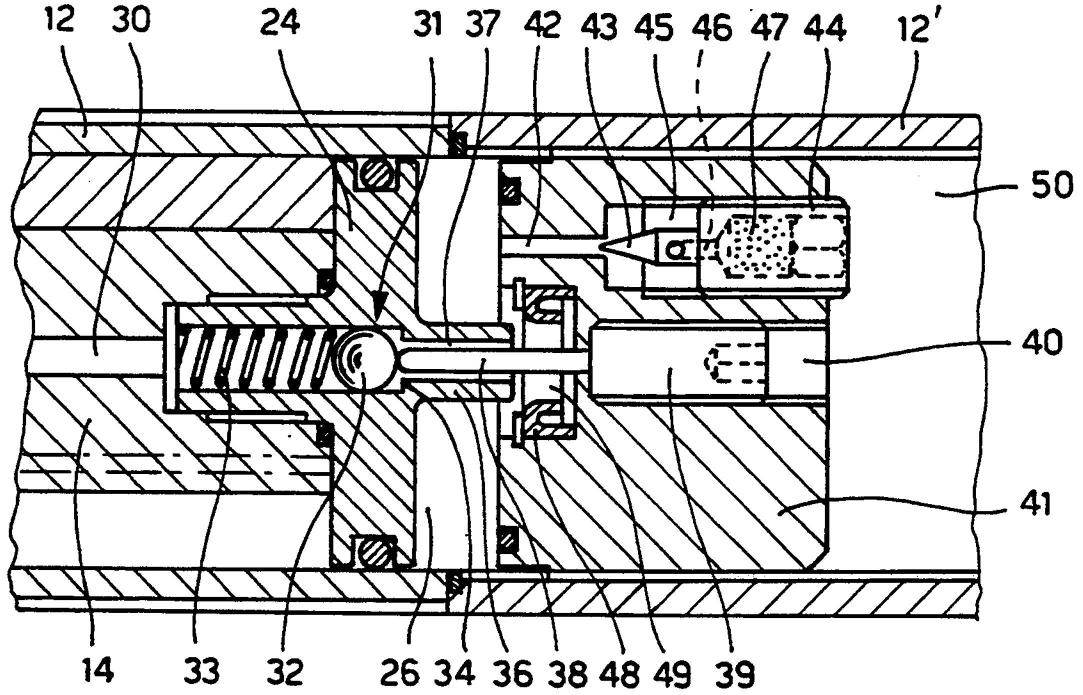
FIG. 3 is an enlarged view of a detail of FIG. 1, relating to a further solution.

In this connection, each rack 13, 14 has formed in it a longitudinal duct 30, as for example illustrated in the rack of the upper cylinder 12 according to FIG. 1, which is able to place the drive chamber 22 in communication with the counter-pressure control chamber 26 via a normally closed unidirectional check valve 31 designed to be opened, in a controlled manner, only when said rack and piston assembly is near the end of its stroke, towards the right in FIGS. 1 and 3, as will be explained below.

In particular, as shown in the example of FIG. 3, the check valve 31 is normally closed and acts to prevent the fluid under pressure flowing from the chamber 22 to the chamber 26 substantially during the entire working stroke of the rack. This valve consists for example of a ball member 32 biased by a spring 33 against an annular seat 34 in the duct 30 inside the piston 24.

On the side opposite to that of the rack 14, the piston 24 is extended by a cylindrical lug 36 provided with an axial passage 37 forming a continuation of the duct 30 from the seat of the ball valve 31, which opens out and extends into the counter-pressure chamber 26.

The ball valve 31 near the end of its stroke, i.e. almost at the end of the movement towards the right in FIG. 3, is opened by a thrust member provided in the form of a pin 38 which protrudes into the control chamber from the end closing wall, and axially penetrates into the passage 37 so as to push back the ball 32 opening the valve 31 at a predetermined position during the reciprocating movement of the actuator rack and piston assembly; when the valve 31 is opened, the fluid under pressure is able to flow instantaneously from the driving chamber 21 or 22 of each cylinder to the counter-pressure chamber 25 or 26, positively generating inside the latter a instantaneous counter-pressure having the same value as, or a value close to the cylinder actuating fluid pressure.

The position of the pin 38 is adjustable axially, being for example provided on a threaded stud 39 screwed into a threaded hole 40 in a stopping element or plug 41 which closes or can be screwed into the corresponding end of the counter-pressure chamber 25, 26 of the respective cylinder. The inside face of the plug 41 defines a stop against which the counter-pressure piston of the respective rack of the actuator comes to rest.

Each counter-pressure chamber 25, 26 of the two cylinders communicates with the atmosphere via a throttling valve comprising a restricted passage 42 formed in the said closing plug 41. The aperture via which the fluid flows out from the passage 42 may be suitably restricted and adjusted for example by means of a needle member 43 mounted on a pin 44 which can be screwed into a corresponding threaded hole 45 of the plug 41. The needle 43 has a passage 46 which, on one side communicates with the restricted passage 42 and on the other side, communicates with the exterior via a filter 47 incorporated in the said threaded pin 44.

In FIG. 3, finally, 48 denotes an annular seal located in a cylindrical cavity 49 of the plug 41, coaxially arranged with respect to the thrust pin 38, through which the tubular lug 36 penetrates at the appropriate moment so as to close the duct 30 in respect to counter-pressure chamber 26 when the valve 31 is opened, so that the fluid under pressure contained in the chamber 25, 26 is forced to flow out from the restricted passage 42.

In the example according to FIG. 1, the plug 41 can be screwed into the respective cylinder in a fixed position corresponding to a pre-fixed travel or stroke of the racks of the actuator. In FIG. 3, on the other hand, the plug 41 is constructed in the form of a cylindrical body, the position of which may be adjusted axially along an extension 50 of the counter-pressure chamber 26, for the reasons explained below.

The operation mode of the pneumatic rack-type actuator according to FIG. 1 is substantially as described below; it is assumed that the needle valve 43 and the thrust member 38 have been suitably adjusted so as to obtain the correct value for the damping counter-pressure inside the chamber 26 and the exact moment for opening of the check valve 31, before the rack and piston assembly in each cylinder reach the stop position.

Assuming moreover that the upper rack and piston assembly of FIG. 1 in a given instant moves to the right, in the direction of the arrow shown, and that correspondingly the other lower rack and piston assembly moves to the left, causing the pinion 15 and associated shaft 165 to rotate in one direction, as soon as the right-hand piston 24 nears the end of its stroke, in the position shown in FIG. 3, the pin 38 of the thrust member penetrates into the bored lug 36, strikes against the ball 32 of the check valve which is therefore opened, overcoming the action of the thrust spring 33. As soon as the check valve 31 is opened, the fluid under pressure inside the drive chamber 22, via the axial passage 30 in the rack and the open check valve 31, passes instantly into the counter-pressure chamber 26 since the lug 36 has not yet penetrated into the seal 48 inside the cavity 40 of the closing plug 41. Under these circumstances, inside the chamber 26 a high counter-pressure value is positively established, being slightly less than the value of the pressure existing in the chamber 22, depending on the back-pressure provided by the restricted passage 42 and the needle valve 43; this provides a first damping action for the most kinetic energy of the system. Continuing its brief stroke to the right of the piston 24, the lug 36 closes on the seal 48 and the pressurised air inside the control chamber 26 is now forced out through the needle valve 43, rapidly damping the remaining kinetic energy accumulated by the two rack and piston assemblies and by the load connected the output shaft.

When the assemblies consisting of the two racks with the associated pistons reaches a stop position, the supply of the pressurised air to the cylinders is reversed and the movement air to the cylinders is reversed and the movement is started in the opposite direction, until the other rack and piston assembly, i.e. the lower one in FIG. 1, assumes a condition similar to that illustrated previously for the upper assembly in FIG. 3, thus activating its pneumatic damping device.

As mentioned previously, the counter-pressure chamber 25, 26 has a diameter which is slightly smaller than that of the actuating chamber 21, 22 in each pneumatic cylinder, such that, taking account of the internal frictional forces, the counter-thrust exerted by the fluid inside the control chamber 26 totally offsets the trust acting inside the other chamber, slowing down and damping completely the movement of the racks.

From the description and illustration it is clear that by suitably adjusting the position of the needle valve 43, it is possible to vary the value of the counter-pressure inside the control chamber 26 according to the kinetic energy accumulated by the moving masses.

It is also clear that, by suitably adjusting the position of the pin member 38, it is possible to bring forward or delay, i.e. to vary the moment of opening of the check valve 31, so as to be able to set it for opening at a desired moment.

In the solution according to the FIG. 1, the plugs 41 with the pin member 38 and the needle valve 43 of the orifice 42 for throttling out the fluid from the counter-pressure control chamber, have a fixed position which does not allow the working stroke of the racks to be changed. However, according to the example of FIG. 3, it is possible to change stroke of the racks and consequently the angle of rotation of shaft 16 between 0° and 180°, with the possibility of obtaining continuous adjustment from 45° to 90° and 0° to 180°, respectively, depending on requirements. This may be obtained, according to the example of FIG. 3, by screwing-in plugs 41 along threaded sections inside the body 10 of the cylinders, so as to cause said plugs 41 to move forward as far as a desired stop position of the rack and piston assemblies depending on the angle of rotation which one wishes to obtain. In all cases, whatever the stop position of said assemblies an efficient pneumatic and positive action is obtained, with deceleration of the same and damping of the kinetic energy accumulated by the moving masses, in an extremely short length of the final stroke movement, independently of the stop positions defined by the plugs 41.

According to the previous example of FIG. 1, on the left-hand of the actuator, namely on the side opposite to that of the plugs containing the pneumatic damping device, the chambers of the two cylinders are closed by a simple plate having formed in it the apertures 27 and 28 for supplying the pressurised fluid to the drive chambers 21 and 22, respectively, of the actuator.

However, according to the present invention, it is also possible to provide an intermediate stopping point at 90° of the stroke of the racks, which can be suitably programmed by means of an additional stop element pneumatically operated in the manner described hereinbelow.

Figure 4:
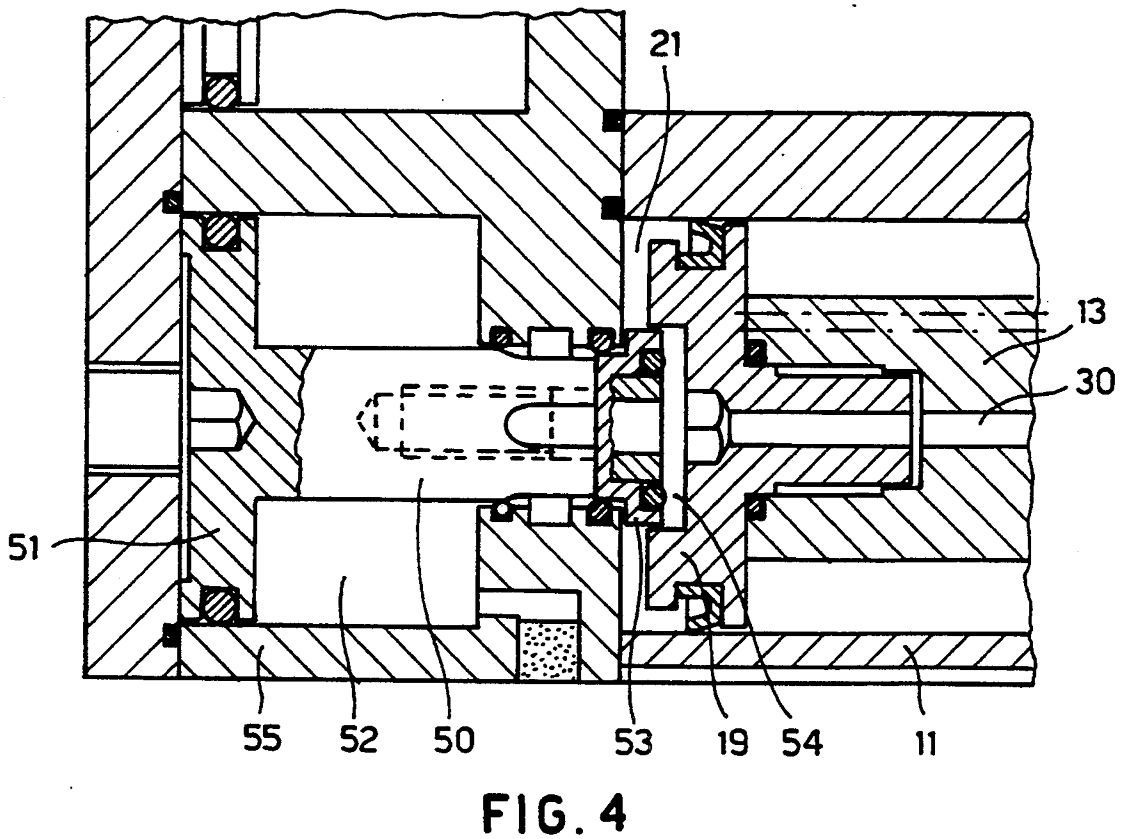
FIG. 4 is an enlarged detail view of a further solution of the pneumatic actuator according to the present invention, in a first operating condition.

As shown in FIG. 4, for example in the case of the lower cylinder 11, at the ends of each cylinder located opposite the pneumatic damping device, there is provided an additional stop element 50 which can be actuated, upon issue of a control signal, so as to protrude partially inside the actuating chamber 21 and 22 respectively, thus resulting in an intermediate stop position for the racks. In the sample shown, the additional stop element 50 consists of a stem connected to the piston 51 of a single-acting cylinder 52 formed or provided in the end closing plate 55. The stem 50 terminates inside the chamber 21 or 22 of the cylinders with an enlarged head 53 against which the piston 19 comes to rest, in alignment with a cavity 54 inside the piston itself, to close duct 30.

Figure 5:
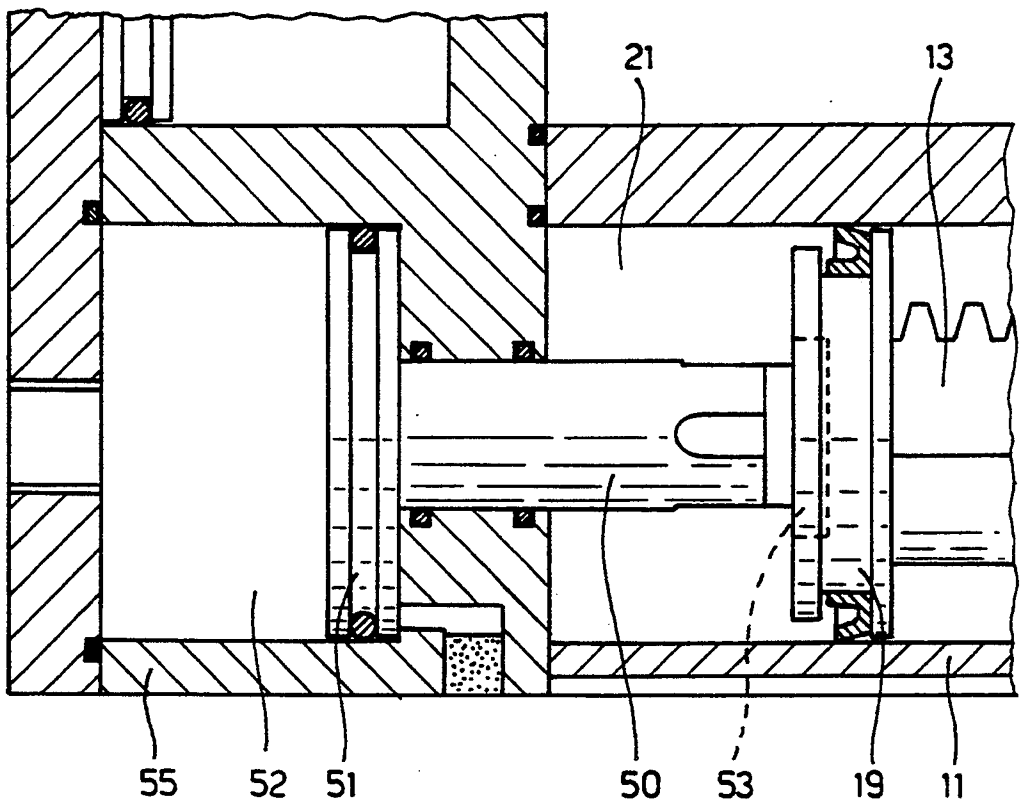
FIG. 5 is a view similar to that of FIG. 4 in a second operating condition.

FIGS. 4 and 5 of the drawings show the two positions of the additional stop element; the retracted position of FIG. 4, where the piston 19 of the rack comes to rest against the end-plate 55, and the advanced position in FIG. 5, where the piston 19 of the rack comes to rest against the intermediate stop element 53. It is obvious that the intermediate stop element must be actuated in advance in a programmed manner in accordance with the operation mode of the entire actuator.

From the above description and that illustrated in the accompanying drawings, it is therefore clear that a twin-rack actuator has been provided, which is able to produce efficient deceleration and damping of the energy accumulated by the system, creating an instantaneous counter-pressure action on the side of a rack opposite to the actuating side, an action which can be suitably and positively controlled at any point of the stroke of the actuator.

It is therefore understood that the above description and illustrations in the accompanying drawings have been provided purely by way of example of the innovative principles of the rack-type actuator according to the invention.

What is claimed is:

1. A pneumatic rotary actuator comprising:

a hollow body (10) defining first and second piston chambers (11, 12) having their longitudinal axes arranged parallel in the hollow body, and also having an air pressure inlet port (27, 28) arranged at one end of each of the piston chambers;

a single acting rack and piston assembly reciprocable in each of the piston chambers, each of the assemblies having a rack (13, 14) provided with piston members (20, 24; 19, 23) at opposite ends thereof;

an output shaft (16) having a gear pinion (15) meshing with the rack and pinion assemblies;

an air pressure-actuated cushioning means including:

a flow restricting control valve (42, 44) offset from a longitudinal axis of each of the piston chambers; and a counter-pressure actuated dampening means (30, 31, 36, 48) including:

tightly closable counter-pressure chamber means (25, 26) at another end of each of the piston chambers, said another end being opposite to the air-pressure inlet port;

duct means (30) axially extending between the opposite ends of each rack and piston assembly, to communicate between both sides of each piston chamber, one end of said duct means opening to and being in direct communication with the air pressure inlet port of the piston chamber; and a check valve (31) to keep normally another end of the duct means closed with respect to the piston chamber;

interacting sealing means (36, 48) coaxially arranged at the other end of the duct means and at the other end of the piston chamber, respectively, to close communication of the duct means with each of the piston chambers defining the counter-pressure means when the rack and piston assemblies approach one end of their strokes; and check valve actuating means (36) coaxially arranged with respect to each of the piston chambers and the interacting sealing means, said check valve actuating means having a thrust pin member (36) protruding into each of the piston chambers and into the duct means through said interacting sealing means; said thrust pin member acting to open the check valve to communicate rapidly with and bring both sides of each piston chamber to equal air pressures shortly before the sealing means interact to close the duct means and before venting the counter-pressure chamber means through the flow restricting control valve.

2. Actuator according to claim 1, in which a restricted orifice, a throttling valve, said thrust pin member, and said interacting sealing means are provided on an end-closing plug element for the counter-pressure chamber means.

3. Actuator according to claim 2, in which the end-closing plug element is longitudinally adjustable inside an extension of the counter-pressure chamber means.

4. Actuator according to claim 1, in which an end stop element is provided for each rack and piston assembly, as well as control means for moving the end stop element between advanced and retracted positions.

5. Actuator according to claim 4, in which said control means for the end stop element includes an independent pneumatic cylinder axially aligned to a drive chamber and sealing means at one end of the end stop element to close the duct means in each rack and piston assembly.

6. Actuator according to claim 1, in which said check valve comprises a ball valve member and a seating means provided in each of the piston chambers at the counter-pressure chamber means, and spring means for urging the ball valve member against the seating means, wherein each of the piston chambers includes a tubular lug coaxially extending the duct means, and further wherein said interacting sealing means is an annular seal member in a cavity at the other end of the counter-pressure chamber means opposite to each of the piston chambers.

7. Actuator according to claim 1, in which the counter-pressure chamber means communicates with exterior atmosphere via a restricted passage having a throttling valve.

8. Actuator according to claim 1, in which said thrust pin member is provided on an axially threadable stud member.

9. Actuator according to claim 1, in which the counter-pressure chamber means has a diameter smaller than a diameter of a corresponding drive chamber.

* * * * *